US010538849B2

(12) United States Patent
Kawamura

(10) Patent No.: US 10,538,849 B2
(45) Date of Patent: Jan. 21, 2020

(54) METHOD FOR RECOVERING AT LEAST ONE VALUABLE CONTAINING TUNGSTEN

(71) Applicant: JX NIPPON MINING & METALS CORPORATION, Tokyo (JP)

(72) Inventor: Toshifumi Kawamura, Hitachi (JP)

(73) Assignee: JX NIPPON MINING & METALS CORPORATION, Tokyo (JP)

(*) Notice: Subject to any disclaimer, the term of this patent is extended or adjusted under 35 U.S.C. 154(b) by 0 days.

(21) Appl. No.: 15/563,112

(22) PCT Filed: Mar. 30, 2016

(86) PCT No.: PCT/JP2016/060582
§ 371 (c)(1),
(2) Date: Sep. 29, 2017

(87) PCT Pub. No.: WO2016/159194
PCT Pub. Date: Oct. 6, 2016

(65) Prior Publication Data
US 2018/0087166 A1 Mar. 29, 2018

(30) Foreign Application Priority Data

Mar. 31, 2015 (JP) ................. 2015-071909

(51) Int. Cl.
C25C 3/34 (2006.01)
C25C 3/00 (2006.01)
(Continued)

(52) U.S. Cl.
CPC .............. *C25C 1/08* (2013.01); *C01G 41/006* (2013.01); *C22B 3/0014* (2013.01); *C22B 34/36* (2013.01); *C25C 1/10* (2013.01); *C25C 7/02* (2013.01)

(58) Field of Classification Search
CPC .... C25C 1/00; C25C 7/02; C25C 1/22; C25C 3/34; C25C 7/00
(Continued)

(56) References Cited

U.S. PATENT DOCUMENTS 3,649,487 A 3/1972 Aue et al.
4,140,597 A 2/1979 Kobayakawa

FOREIGN PATENT DOCUMENTS

JP 53-84812 A 7/1978
JP 54-159325 A 12/1979
(Continued)

OTHER PUBLICATIONS

International Search Report, issued in PCT/JP2016/060582, PCT/ISA/210, dated May 17, 2016.
(Continued)

*Primary Examiner* — Zulmariam Mendez
(74) *Attorney, Agent, or Firm* — Birch, Stewart, Kolasch & Birch, LLP

(57) ABSTRACT

Provided is a method for efficiently separating and recovering tungsten and other valuable(s) from at least one valuable containing tungsten. The present invention relates to a method for recovering at least one valuable containing tungsten, comprising subjecting a raw material mixture comprising at least one valuable containing tungsten to electrolysis using an electrolytic solution containing at least one alcohol amine to dissolve tungsten in the electrolytic solution, electrodeposit a part of the valuable(s) onto a cathode used for the electrolysis and separate at least one valuable other than the valuable(s) electrodeposited onto the cathode as a residue in the electrolytic solution, and then separating and recovering each of the residue and the valuable(s) electrodeposited onto the cathode.

20 Claims, 2 Drawing Sheets

(51) Int. Cl.
      *C25C 7/00*       (2006.01)
      *C25C 1/08*       (2006.01)
      *C25C 1/10*       (2006.01)
      *C22B 34/36*      (2006.01)
      *C01G 41/00*      (2006.01)
      *C22B 3/28*       (2006.01)
      *C25C 7/02*       (2006.01)

(58) Field of Classification Search
      USPC .......................................................... 205/560
      See application file for complete search history.

(56) References Cited

FOREIGN PATENT DOCUMENTS

| JP | 2004-43946 A | 2/2004 |
| JP | 2011-47013 A | 3/2011 |
| JP | 2013-194269 A | 9/2013 |
| JP | 5329615 B2 | 10/2013 |
| JP | 2014-129583 A | 7/2014 |
| JP | 2014-173157 A | 9/2014 |

OTHER PUBLICATIONS

Written Opinion of the International Searching Authority, issued in PCT/JP2016/060582, PCT/ISA/237, dated May 17, 2016.

English translation of the International Preliminary Report on Patentability and Written Opinion of the International Searching Authority (Forms PCT/IB/338, PCT/IB/373 and PCT/ISA/237) dated Oct. 12, 2017, for International Application No. PCT/JP2016/060582.

Extended European Search Report, dated Nov. 27, 2018, for corresponding European Application No. 16773075.3.

METHOD FOR RECOVERING AT LEAST ONE VALUABLE CONTAINING TUNGSTEN

TECHNICAL FIELD

The present invention relates to a method for recovering at least one valuable containing tungsten, and more particularly to a method for separating and recovering tungsten and other valuable(s) from the at least one valuable containing tungsten.

BACKGROUND ART

A recovery method of metals usually involves a process of crushing scrap containing the metals and dissolving them in an alkaline solution. However, in the recovery of tungsten, applying such a conventional process is very difficult because tungsten is a very hard and highly chemical resistant metal. Therefore, it is a common method in the art that tungsten is oxidized by a strong treatment with alkali molten salts or the like to dissolve and recover tungsten (Patent Document 1, Patent Document 2 and the like).

In the common method, a tungsten-used target and an end material are originally high purity, so that the use of the molten salt treatment or pulverization which is the general treatment as described above will lead to significant reduction of purity. Therefore, in order to provide tungsten with high purity, multistage purification, ion exchange treatment and the like will be required, thereby leading to complicated treating steps.

Electrolysis is known as the method for dissolving tungsten. To recover tungsten with high purity, ammonium nitrate that is an inorganic solution would be considered to be used for the electrolytic solution. However, it is necessary to separately add ammonia to adjust a pH of the electrolytic solution in order to carry out alkaline electrolysis.

However, ammonium nitrate itself increases a risk of explosion at high concentration. It is thus necessary to control the concentration of ammonium nitrate during electrolysis. Furthermore, since ammonia also has a concentration change due to volatilization in an electrolysis temperature range, concentration control and the like are necessary, so that running costs are required for recovery equipment, control equipment and the like. In addition, an impurity-free treating method is required for the recovery of tungsten from materials having originally high purity, such as used targets and end materials.

To solve the above problems, the present inventors previously found that tungsten with high purity could be recovered with a low cost by carrying out electrolysis using an alcohol amine-containing electrolytic solution (Patent Document 3).

CITATION LIST

Patent Literature

Patent Document 1: Japanese Patent Application Laid-Open Publication No. 2011-047013 A1
Patent Document 2: Japanese Patent Application Laid-Open Publication No. 2013-194269 A1
Patent Document 3: Japanese Patent No. 5329615 B1

SUMMARY OF THE INVENTION

Technical Problem

However, there has been conventionally still room for consideration of a technique in which tungsten and other valuable are efficiently separated and recovered from a raw material mixture containing tungsten that is not high purity and other valuable. Therefore, there is a need for early development of the separating and recovering method.

Thus, an object of the present invention is to provide a method for efficiently separating and recovering tungsten and other valuable(s) from the at least one valuable containing tungsten.

Solution to Problem

To solve the above problems, the present inventors have found that a raw material mixture containing tungsten that is not high purity and other valuable(s) can be subjected to electrolysis using at least one alcohol amine for an electrolytic solution to dissolve tungsten in the electrolytic solution, electrodeposit a part of the valuable(s) onto a cathode used for the electrolysis and separate at least one valuable other than the valuable(s) electrodeposited onto the cathode as a residue in the electrolytic solution. Thus, the present inventors have found that high purity tungsten and other valuable(s) can be separated and recovered at the same time from the raw material mixture containing tungsten that is not high purity and the other valuable(s).

In addition, although Japanese Patent Application Laid-open Publication No. 2008-121118 A1 mentions an electrolytic solution for electrolytic polishing, and uses an amine for the electrolytic solution, the electrolytic solution also contain methanesulfonic acid as an essential component, which is different from the present invention. Further, it is disadvantageous in that methanesulfonic acid is strongly acidic and very expensive.

In one aspect, the present invention completed on the basis of the above findings provides a method for recovering at least one valuable containing tungsten, comprising subjecting a raw material mixture comprising at least one valuable containing tungsten to electrolysis using an electrolytic solution containing at least one alcohol amine to dissolve tungsten in the electrolytic solution, electrodeposit a part of the valuable(s) onto a cathode used for the electrolysis and separate at least one valuable other than the valuable(s) electrodeposited onto the cathode as a residue in the electrolytic solution, and then separating and recovering each of the residue and the valuable(s) electrodeposited onto the cathode.

In an embodiment of the method for recovering the at least one valuable containing tungsten according to the present invention, the valuable(s) to be electrodeposited onto the cathode used for the electrolysis may be one or more selected from the group consisting of cobalt, nickel, iron, chromium and vanadium.

In another embodiment of the method for recovering the at least one valuable containing tungsten according to the present invention, the cathode used for the electrolysis may be formed of titanium, stainless steel, iridium, niobium or zirconium.

In a further embodiment of the method for recovering the at least one valuable containing tungsten according to the present invention, the at least one valuable that is the residue in the electrolytic solution may be one or more selected from the group consisting of titanium, tantalum and silica.

In yet another embodiment of the method for recovering the at least one valuable containing tungsten according to the present invention, the at least one alcohol amine may be monoethanolamine and/or triethanolamine.

In yet another embodiment of the method for recovering the at least one valuable containing tungsten according to the present invention, a concentration of the alcohol amine in the electrolytic solution may be from 1 to 80% by mass.

In yet another embodiment of the method for recovering the at least one valuable containing tungsten according to the present invention, the raw material mixture may contain from 1 to 30% by mass of at least one valuable other than tungsten.

In yet another embodiment of the method for recovering the at least one valuable containing tungsten according to the present invention, the raw material mixture may contain from 1 to 10% by mass of at least one valuable other than tungsten.

In yet another embodiment of the method for recovering the at least one valuable containing tungsten according to the present invention, the raw material mixture may contain from 3 to 10% by mass of at least one valuable other than tungsten.

In yet another embodiment of the method for recovering the at least one valuable containing tungsten according to the present invention, the electrolysis may be carried out by adjusting a temperature of the electrolytic solution to 20 to 80° C.

In yet another embodiment of the method for recovering the at least one valuable containing tungsten according to the present invention, the electrolytic solution may have a pH of 9 or more.

In a further embodiment of the method for recovering the at least one valuable containing tungsten according to the present invention, an anode used for the electrolysis may be a titanium basket provided with the raw material mixture comprising the at least one valuable containing tungsten.

In yet another embodiment of the method for recovering the at least one valuable containing tungsten according to the present invention, separation efficiency Co/W of cobalt Co in the valuable(s) deposited onto the cathode to tungsten W may be 100 or more.

Advantageous Effects of Invention

According to the present invention, it is possible to provide a method for efficiently separating and recovering tungsten and other valuable from at least one valuable containing tungsten.

DESCRIPTION OF EMBODIMENTS

Hereinafter, embodiments of the method for recovering the at least one valuable containing tungsten according to the present invention will be described in detail.

First, a raw material mixture to be treated is prepared, which contains at least one valuable containing tungsten. Examples of the raw material mixture containing the at least one valuable containing tungsten include so-called tungsten recycled materials obtained by pulverizing tungsten scrap and the like. For example, the raw material mixture comprising the at least one valuable containing tungsten to be treated according to the present invention may contain from 0 to 15% by mass of Co, from 0 to 5% by mass of Ni, from 0 to 5% by mass of Fe, from 0 to 5% by mass of Ti, and form 0 to 15% by mass of Ta, and have the tungsten content of from 3 to 95% by mass. Further, the raw material mixture comprising the at least one valuable containing tungsten to be treated according to the present invention may contain from 1 to 60% by mass of at least one valuable other than tungsten, or from 1 to 30% by mass of at least one valuable other than tungsten, or from 3 to 10% by mass of at least one valuable other than tungsten. In the present invention, high purity tungsten can be efficiently separated and recovered from the raw material mixture that does not contain such high purity tungsten at one time.

Then, an electrolytic bath provided with an anode, a cathode and an electrolytic solution is prepared, and the bath is used to carry out electrolysis of the raw material mixture comprising the at least one valuable containing tungsten.

Figure 1:
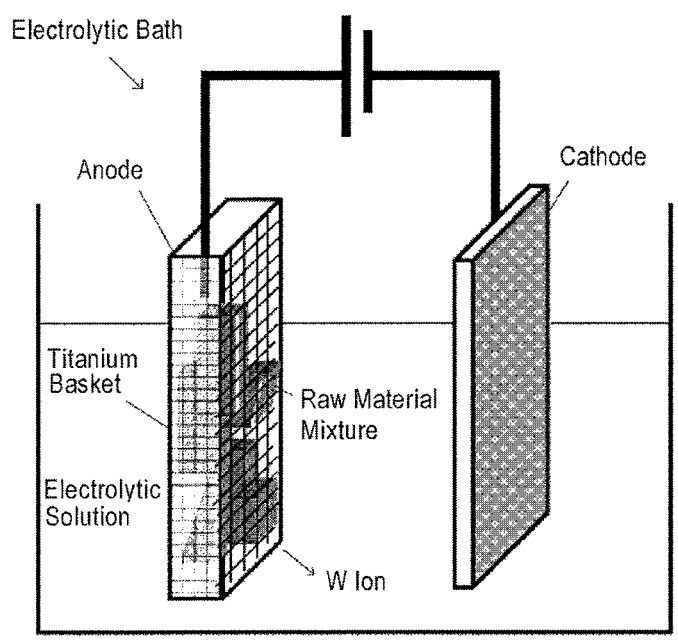
FIG. 1 is a schematic view of an example of an electrolytic bath according to an embodiment of the present invention.

The electrolytic bath is not particularly limited, but may be, for example, the configuration as shown in FIG. 1. In FIG. 1, a titanium basket is used as the anode, and the raw material mixture comprising the at least one valuable containing tungsten is provided in the titanium basket. The titanium basket is preferable in that it is stable under high voltage, high current and high temperature electrolytic processing conditions of the present invention.

The electrolytic solution contains at least one alcohol amine. Examples of the alcohol amine include triethanolamine, diethanolamine, monoethanolamine, aminopropanol, methylethanolamine and the like. In particular, monoethanolamine and triethanolamine are preferable because they are inexpensive.

When the alcohol amine is used for the electrolytic solution, the treatment reaction system of electrolysis does not contain impurities such as Na, K, Fe and S, so that tungsten having high purity can be recovered. Further, tungsten having purity of 4N or more can be obtained from the recycled materials and the like. In addition, the electrolytic solution has high voltage endurance and is stable, and also has low pH dependency, so that easy controlling of electrolysis can be achieved, and the electrolytic solution does not need supplement due to volatilization that will be required when the electrolytic solution is ammonia, so that a low cost processing can be achieved. Although a clear reason why the alcohol amine electrolytic solution has high voltage endurance and is stable is not known, the reason would be possibly because the electrolytic solution is stabilized by coordinating the dissolved tungsten with the alcohol amine.

The concentration of the alcohol amine in the electrolytic solution may be preferably from 1 to 80% by mass. If the concentration of the alcohol amine in the electrolytic solution is less than 1% by mass, conductivity will excessively decreased and electrolysis will become unstable, so that complex formation may be difficult. If the concentration of the alcohol amine in the electrolytic solution is more than 80% by mass, solubility in water will be exceeded depending on the type of the electrolytic solution and the concentration will be unnecessarily increased, which will be disadvantageous in terms of costs. The concentration of the alcohol amine in the electrolytic solution may be more preferably from 2 to 50% by mass, and still more preferably from 5 to 40% by mass, and still more preferably from 5 to 20% by mass.

The temperature of the electrolytic solution during electrolysis may be adjusted to 20 to 80° C. to carry out the electrolysis. The temperature of the electrolytic solution of 20 to 80° C. may stabilize the alcohol amine and satisfactorily suppress volatilization of the alcohol amine. Therefore, the points where the electrolytic solution does not volatilize and is stable and has few impurities in the electrolysis reaction are very advantageous for the processes of recovering tungsten having high purity and separating and recovering other valuables, in terms of a total cost. The temperature of the electrolytic solution may be more preferably set to an elevated temperature of 60° C. or higher in terms of the electrolysis rate. For example, ammonia aggressively volatilizes at 50° C. or higher and requires a large amount of supplement, but the alcohol amine based electrolytic solution has a higher boiling point and is hard to volatilize, so that the alcohol amine based electrolytic solution can be used at 60° C. or higher without any problem.

The pH of the electrolytic solution is adjusted such that the electrolytic solution is weakly alkaline, and may be preferably 9 or more, and more preferably 10 or more. If the pH is less than 9, a produced tungstate ion will become difficult to be dissolved, and will be precipitated as $WO_3$ or $H_2WO_4$, and as a result, electrolytic dissolution may be inhibited.

Figure 2:
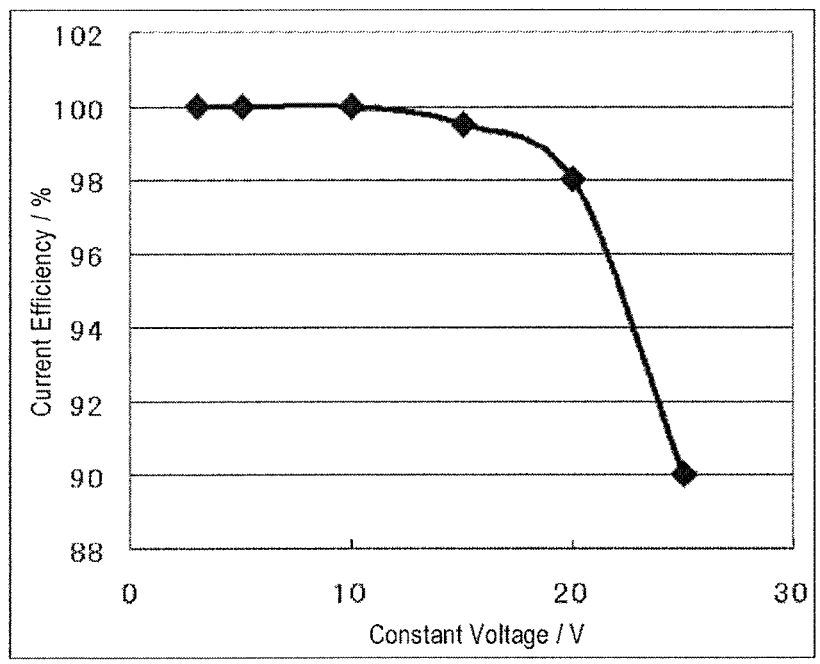
FIG. 2 is a diagram showing a relationship between constant voltage and current efficiency in electrolysis.

The alcohol amines used in the electrolytic solution have high voltage endurance and high current density resistance. For high productivity, higher set voltage and higher set current density in electrolysis is preferred, but practically, the set voltage may be 20 V or less and the set current density may be 500 A/dm$^2$ in view of limitations of facilities and damages to the cathode side. As a reference, FIG. 2 shows the relationship between constant voltage and current efficiency in the electrolysis.

Thus, by conducting electrolysis of the raw material mixture comprising the at least one valuable containing tungsten using the electrolyte solution containing the alcohol amine, tungsten is dissolved in the electrolytic solution while at the same time electrodepositing a part of the valuable(s) onto the cathode used for the electrolysis. Further, at least one valuable other than the valuable(s) electrodeposited onto the cathode by the electrolysis is a residue in the electrolytic solution. Thus, high purity tungsten and other valuable can be separated and recovered at the same time from the raw material mixture containing tungsten that is not high purity and the other valuable.

The recovery of tungsten will be described in more detail. After dissolving tungsten in the electrolytic solution by the electrolysis with the alcohol amine which is an impurity-free electrolytic solution, the electrolytic solution is neutralized with hydrochloric acid, nitric acid or like, and tungsten is removed as a hydroxide. In this case, the tungsten already has very high purity of 4 N or more in the state of hydroxide. Further, tungsten can be recovered as high purity $WO_3$ or W by concentrating the resulting tungsten hydroxide to form a tungstate salt compound, and optionally heating and reducing the tungstate salt compound.

The valuable(s) electrodeposited onto the cathode used for electrolysis may be one or more selected from the group consisting of cobalt, nickel, iron, chromium and vanadium, for example. These valuables can be separated from tungsten that can be easily dissolved in the electrolytic solution, and other residue, by a known method such as controlling of the pH in the acid-leaching to an alkaline side. Further, when the cathode used for the electrolysis is made of, for example, titanium, stainless steel, iridium, niobium or zirconium, the above cobalt, nickel, iron or like can be satisfactorily electrodeposited, which is preferred. Here, the stainless steel may be stainless steel of Fe, Ni or Cr.

The at least one valuable that is the residue in the electrolytic solution may be, for example, one or more selected from the group consisting of titanium, tantalum and silica. These valuables are electrolytically inactive, so that they can be easily separated as the residue without special treatment.

In the method for recovering the at least one valuable containing tungsten according to the present invention, the separation efficiency Co/W of cobalt Co in the valuable(s) deposited onto the cathode to tungsten W is preferably 100 or more.

Here, the separation efficiency Co/W of cobalt Co in the valuable(s) deposited onto the cathode to tungsten W corresponds to a weight ratio of a weight of Co deposited onto the cathode to a weight of W.

EXAMPLE

Hereinafter, Examples of the present invention will be described, but the Examples are merely for the purpose of illustration and are not intended to limit the present invention.

Example 1

10 kg of super hard material scrap having the contents as shown in Table 1 was placed in a titanium basket to prepare an anode for an electrolytic bath.

A titanium plate was used as a cathode for the electrolytic bath.

10% by mass of monoethanolamine was used as an electrolytic solution which was prepared by adding pure water to the monoethanolamine to bring about 20 L. Electrodissolution was carried out at a current density of 5 A/dm$^2$ and a constant current of 100 A at a temperature of 70° C. for 10 hours.

As a result, 1 kg of metallic cobalt was deposited on the surface of the titanium plate of the cathode. Further, tungsten was dissolved in the electrolytic solution, and a residue was generated in the electrolytic solution.

The metallic cobalt on the titanium plate surface of the cathode was then peeled off to recover it. Further, the electrolytic solution was filtered and a filtrate was treated with an acid to recover tungsten. Furthermore, a residue obtained after the filtration was treated with an acid and an alkali to recover tantalum.

The quality of the recovered cobalt was very high, which was 300 of Co/W, relative to the recovered tungsten.

TABLE 1

| W mass % | Co mass % | Ni mass % | Ta mass % | Fe mass % |
| --- | --- | --- | --- | --- |
| 80 | 12 | 1 | 2 | 1 |

Example 2

Using 10 kg of super hard material scrap having the contents as shown in Table 2 as an anode for an electrolytic bath, electrolysis was carried out by directly applying current to the scrap.

A titanium plate was used as a cathode for the electrolytic bath.

10% by mass of monoethanolamine was used as an electrolytic solution which was prepared by adding pure water to the monoethanolamine to bring about 10 L. Electrodissolution was carried out at a current density of 10 A/dm$^2$ and a constant current of 100 A at a temperature of 70° C. for 10 hours.

As a result, 0.9 kg of metallic cobalt was deposited on the surface of the titanium plate of the cathode. Further, tungsten was dissolved in the electrolytic solution, and a residue was generated in the electrolytic solution.

The metallic cobalt on the titanium plate surface of the cathode was then peeled off to recover it. Further, the electrolytic solution was filtered and a filtrate was treated with an acid to recover tungsten. Furthermore, a residue obtained after the filtration was treated with an acid and an alkali to recover tantalum.

The quality of the recovered cobalt was very high, which was 200 of Co/W, relative to the recovered tungsten.

TABLE 2

| W mass % | Co mass % | Ni mass % | Ta mass % | Fe mass % |
|---|---|---|---|---|
| 70 | 10 | 1 | 10 | 1 |

Comparative Example 1

In Comparative Example 1, ammonium nitrate was used in place of monoethanolamine for the electrolytic solution under the test conditions of Example 1. Although current was applied for 10 hours, the electrolysis hardly progressed. Further, since the pH of the electrolytic solution was severely lowered, a large amount of ammonia was supplied to the electrolytic solution.

What is claimed is:

1. A method for recovering at least one valuable containing tungsten, comprising subjecting a raw material mixture comprising at least one valuable containing tungsten to electrolysis using an electrolytic solution containing at least one alcohol amine to dissolve tungsten in the electrolytic solution, electrodeposit a part of the valuable(s) onto a cathode used for the electrolysis and separate at least one valuable other than the valuable(s) electrodeposited onto the cathode as a residue in the electrolytic solution, and then separating and recovering each of the at least one valuable in the residue, tungsten dissolved in the electrolytic solution, and the valuable(s) electrodeposited onto the cathode.

2. The method for recovering the at least one valuable containing tungsten according to claim 1, wherein the valuable(s) to be electrodeposited onto the cathode used for the electrolysis is one or more selected from the group consisting of cobalt, nickel, iron, chromium and vanadium.

3. The method for recovering the at least one valuable containing tungsten according to claim 2, wherein the cathode used for the electrolysis is formed of titanium, stainless steel, iridium, niobium or zirconium.

4. The method for recovering the at least one valuable containing tungsten according to claim 1, wherein the at least one valuable that is the residue in the electrolytic solution is one or more selected from the group consisting of titanium, tantalum and silica.

5. The method for recovering the at least one valuable containing tungsten according to claim 1, wherein the at least one alcohol amine is monoethanolamine and/or triethanolamine.

6. The method for recovering the at least one valuable containing tungsten according to claim 1, wherein a concentration of the alcohol amine in the electrolytic solution is from 1 to 80% by mass.

7. The method for recovering the at least one valuable containing tungsten according to claim 1, wherein the raw material mixture contains from 1 to 30% by mass of at least one valuable other than tungsten.

8. The method for recovering the at least one valuable containing tungsten according to claim 7, wherein the raw material mixture contains from 1 to 10% by mass of at least one valuable other than tungsten.

9. The method for recovering the at least one valuable containing tungsten according to claim 8, wherein the raw material mixture contains from 3 to 10% by mass of at least one valuable other than tungsten.

10. The method for recovering the at least one valuable containing tungsten according to claim 1, wherein the electrolysis is carried out by adjusting a temperature of the electrolytic solution to 20 to 80° C.

11. The method for recovering the at least one valuable containing tungsten according to claim 1, wherein the electrolytic solution has a pH of 9 or more.

12. The method for recovering the at least one valuable containing tungsten according to claim 1, wherein an anode used for the electrolysis is a titanium basket provided with the raw material mixture comprising the at least one valuable containing tungsten.

13. The method for recovering the at least one valuable containing tungsten according to claim 1, wherein separation efficiency Co/W of cobalt Co in the valuable(s) deposited onto the cathode to tungsten W is 100 or more.

14. The method for recovering the at least one valuable containing tungsten according to claim 2, wherein the at least one valuable that is the residue in the electrolytic solution is one or more selected from the group consisting of titanium, tantalum and silica.

15. The method for recovering the at least one valuable containing tungsten according to claim 3, wherein the at least one valuable that is the residue in the electrolytic solution is one or more selected from the group consisting of titanium, tantalum and silica.

16. The method for recovering the at least one valuable containing tungsten according to claim 2, wherein the at least one alcohol amine is monoethanolamine and/or triethanolamine.

17. The method for recovering the at least one valuable containing tungsten according to claim 3, wherein the at least one alcohol amine is monoethanolamine and/or triethanolamine.

18. The method for recovering the at least one valuable containing tungsten according to claim 4, wherein the at least one alcohol amine is monoethanolamine and/or triethanolamine.

19. The method for recovering the at least one valuable containing tungsten according to claim 2, wherein a concentration of the alcohol amine in the electrolytic solution is from 1 to 80% by mass.

20. The method for recovering the at least one valuable containing tungsten according to claim 3, wherein a concentration of the alcohol amine in the electrolytic solution is from 1 to 80% by mass.

* * * * *